April 8, 1930.  H. G. NORWOOD  1,753,313

NONINTERLINKING NUT LOCK WASHER

Filed May 8, 1928

Inventor
HARRY G. NORWOOD
Attorney

Patented Apr. 8, 1930

1,753,313

UNITED STATES PATENT OFFICE

HARRY G. NORWOOD, OF BALTIMORE, MARYLAND, ASSIGNOR TO THE POSITIVE LOCK WASHER COMPANY, OF NEWARK, NEW JERSEY, A CORPORATION OF NEW JERSEY

NONINTERLINKING NUT-LOCK WASHER

Application filed May 8, 1928. Serial No. 276,058.

This invention relates to means for preventing spring nut lock washers from interlinking when they are thrown together in bulk when handling and shipping. Where washers of this kind become interlinked, as they do in practice, during shipment, much time is consumed by the workmen in separating the washers so that they may be used. In certain factories, for example in the automotive industry, where these kinds of washers are used in tremendous quantity, the time involved in separating the ordinary split lock washers, means a great loss in money.

It is therefore the principal object of my invention to provide means for preventing the interlinking of these washers. While obtaining the principal object of my invention, I also secure additional advantages by obtaining increased locking pressures, brought about by the means involved in securing the non-interlinking feature.

These and other objects will be apparent to one skilled in this art after a study of the specification taken in connection with the annexed drawing, wherein—

Referring now to the details in which like numbers refer to corresponding parts in the different views noted.

Figure 1:
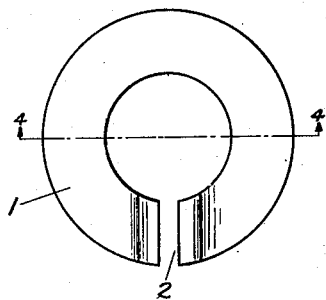
Figure 1 is a plan view of one form of my improved form of washer.
Figure 2:
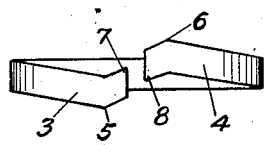
Figure 2 is a side elevation of Figure 1.

1 is the body of the washer which is split at 2. As shown in Figure 2, the ends 3 and 4 of the washer adjacent the split 2, are formed by bending or offsetting the entire body of metal so as to provide projections 7 and 8 which extend in opposite directions to points where they overlap or intercept the circumferential opening between these ends. Were the ends 3 and 4 without the projections 7 and 8, another washer of the same kind, would slip by this circumferential opening and the washers would interlink, assuming of course that the pitch of the spiral of the washer is within certain limits. The projections 7 and 8 prevent this action from taking place.

At the same time, the points 5 and 6 act to grip into the material as the nut is tightened down, thereby giving the usual lock similar to that shown in Trumbull Patent 440,870, issued November 18, 1890. If in certain sizes of washers, the pressure of the nut is sufficient to embed the points 5 and 6 into the material sufficiently to allow the projections 7 and 8 to come into the same planes as the points 6 and 5 respectively, there might be then some tendency for the nut engaging an extreme corner of the projections 7 or 8 to spread the washer. In such cases, I prefer to slightly round the corners of the projections 7 and 8 so as to allow the nut to ride over them without spreading the washer. Even though these corners be slightly rounded as indicated, an increased efficiency in the locking feature of the washer is obtained. The same thing applies to the other forms of washers shown.

Figure 3:
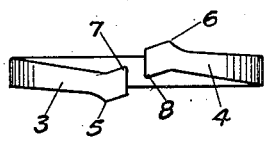
Figure 3 is like Figure 2, but of a modified form.
Figure 4:
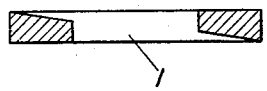
Figure 4 is a sectional view taken on the line 4—4 of Figure 1.

In Figure 3, the same advantages as shown in Figure 2 are obtained, but the ends 3 and 4 of the washer are shown slightly tapered to allow these ends to function to give a little more flexibility at these ends as set forth in said Trumbull patent.

In the two forms of the washers shown, it will be seen that the stock of the washer is cut straight across its width, or substantially on one of its diameters, and that the split ends of the washer do not overlap; that is to say, the ends adjacent the split 2, are on opposite sides of a plane including a diameter of the washer, which means that the ends 3 and 4 of the washer may be displaced sufficiently to provide a maximum spring effect, while at the same time obtaining the non-interlinking feature and furthermore securing a greater locking effect.

Having thus described my invention, what I claim is:

1. In a spring nut lock washer having a transverse split and the ends adjacent the split offset a predetermined amount in opposite directions to give the spring effect, means for preventing the washers when thrown together in bulk from interlinking, comprising; a bend in the whole body of the stock at each end adjacent the split and extending in a direction opposite to that of the offset so that the ends overlap or intercept the opening between the ends of said offset portions for the purpose described.

2. In a spring lock washer having the stock cut across its width substantially on a radius of the washer and the cut ends offset a predetermined amount to give the spring effect, means for obtaining an increased gripping action and for preventing the washers, when thrown together in bulk, from interlinking comprising a formation at each cut end of the washer, said formation consisting of a bend in the entire body of the stock, the bend being a short distance from the cut, whereby there is formed a gripping spur substantially opposite the line of each bend, and a gripping edge at the opposite corners of the cut adjacent the line of each bend, no part of said gripping edges extending beyond a plane through and parallel to the cut, and including a diameter of the washer, but acting to intercept the opening between said ends.

3. In a spring lock washer having a transverse split along a diameter of the washer and the ends, adjacent the split, offset a predetermined amount in opposite directions to give the spring effect, said ends being tapered and ending in enlarged portions which are bent bodily at the end of the taper in a direction opposite to that of the offset so that the ends overlap or intercept the opening between the ends of said offset portions, each of said enlarged portions having gripping edges on opposite sides of the washer.

In testimony whereof, I affix my signature.

HARRY G. NORWOOD.